United States Patent
van den Brink et al.

(10) Patent No.: US 11,665,801 B2
(45) Date of Patent: *May 30, 2023

(54) REPLACEMENT MIRROR SYSTEM WITH IR LED OVERHEATING MANAGEMENT

(71) Applicant: Orlaco Products B.V., Barneveld (NL)

(72) Inventors: Alfred van den Brink, Barneveld (NL); Kent Palsson, Sollentuna (SE)

(73) Assignee: ORLACO PRODUCTS B.V., Barneveld (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,172

(22) Filed: Sep. 27, 2021

(65) Prior Publication Data

US 2022/0015208 A1    Jan. 13, 2022

Related U.S. Application Data

(63) Continuation of application No. 16/787,403, filed on Feb. 11, 2020, now Pat. No. 11,153,950.

(60) Provisional application No. 62/805,535, filed on Feb. 14, 2019.

(51) Int. Cl.
- *H04N 23/56* (2023.01)
- *H05B 45/46* (2020.01)
- *B60R 1/12* (2006.01)

(52) U.S. Cl.
CPC .............. *H05B 45/46* (2020.01); *B60R 1/12* (2013.01); *H04N 23/56* (2023.01); *B60R 2001/1253* (2013.01)

(58) Field of Classification Search
CPC ... H05B 45/46; B60R 1/12; B60R 2001/1253; B60R 2300/8046; B60R 2300/103; B60R 2300/8053; B60R 1/00; H04N 5/2256
See application file for complete search history.

(56) References Cited

U.S. PATENT DOCUMENTS

| 5,889,192 A | 3/1999 | Engel |
| 7,525,816 B2 | 4/2009 | Sawachi |

(Continued)

FOREIGN PATENT DOCUMENTS

| CN | 206164701 U | 5/2017 |
| DE | 29806638 U1 | 6/1998 |

(Continued)

OTHER PUBLICATIONS

Partial International Search for PCT Application No. PCT/EP2020/053647 dated Apr. 1, 2020.

(Continued)

*Primary Examiner* — Michael Lee
(74) *Attorney, Agent, or Firm* — Carlson, Gaskey & Olds, P.C.

(57) ABSTRACT

A camera mirror system for a vehicle includes, among other things, a camera that has a field of view, a display in communication with the camera that is configured to depict the field of view, and an infrared light-emitting diode (IR LED) that is configured to illuminate the field of view. The IR LED is configured to operate at a temperature. The system further includes a controller that is configured to provide at least one of a warning or an IR LED shut down command in response to the temperature exceeding a threshold.

12 Claims, 4 Drawing Sheets

(56) References Cited

U.S. PATENT DOCUMENTS

| | | | |
|---|---|---|---|
| 8,581,982 B1 * | 11/2013 | Haley | B60R 1/00 |
| | | | 348/148 |
| 11,153,950 B2 * | 10/2021 | van den Brink | B60R 1/12 |
| 2005/0041435 A1 | 2/2005 | Moisel | |
| 2005/0243172 A1 | 11/2005 | Takano et al. | |
| 2006/0115120 A1 | 6/2006 | Taniguchi et al. | |
| 2007/0057267 A1 | 3/2007 | Oman | |
| 2010/0066527 A1 | 3/2010 | Liou | |
| 2010/0070139 A1 | 3/2010 | Ohshima et al. | |
| 2010/0238292 A1 | 9/2010 | Sato | |
| 2011/0273527 A1 | 11/2011 | Liu | |
| 2012/0019145 A1 | 1/2012 | Lai | |
| 2013/0155714 A1 | 6/2013 | Yano, Jr. et al. | |
| 2014/0043478 A1 * | 2/2014 | Burton | G08B 13/1963 |
| | | | 348/143 |
| 2014/0231625 A1 | 8/2014 | Chang et al. | |
| 2016/0065844 A1 | 3/2016 | Yao | |
| 2017/0104939 A1 | 4/2017 | Sun | |
| 2018/0077352 A1 * | 3/2018 | Orglmeister | G08B 17/125 |
| 2019/0052843 A1 | 2/2019 | Izumi et al. | |
| 2019/0158710 A1 | 5/2019 | Hirota | |
| 2019/0285968 A1 | 9/2019 | Hoshino | |
| 2020/0018111 A1 | 1/2020 | Akbarian et al. | |
| 2020/0195816 A1 | 6/2020 | Stein et al. | |
| 2020/0274995 A1 * | 8/2020 | Coleman | H04N 5/2252 |

FOREIGN PATENT DOCUMENTS

| | | |
|---|---|---|
| EP | 665599 B1 | 5/1998 |
| EP | 1466785 A1 | 10/2004 |
| JP | 2000115759 A | 4/2000 |
| JP | 2008124303 A | 5/2008 |
| JP | 4140898 B2 | 8/2008 |
| TW | M378332 U1 | 4/2010 |
| WO | 2013048234 A1 | 4/2013 |

OTHER PUBLICATIONS

International Search Report and Written Opinion for International Application No. PCT/EP2020/053647 dated Jun. 24, 2020.
International Preliminary Report on Patentability for International Application No. PCT/EP2020/053647 dated Aug. 26, 2021.

* cited by examiner

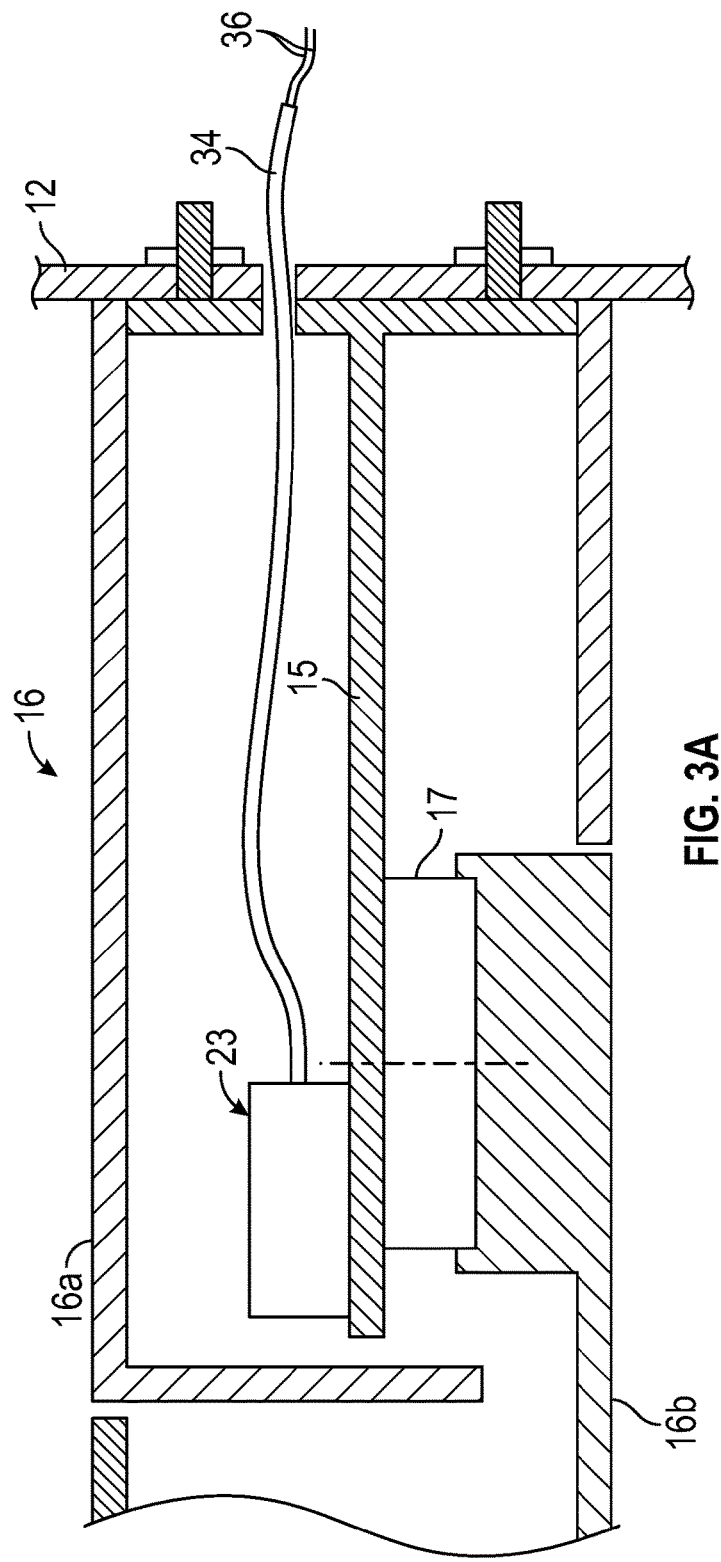
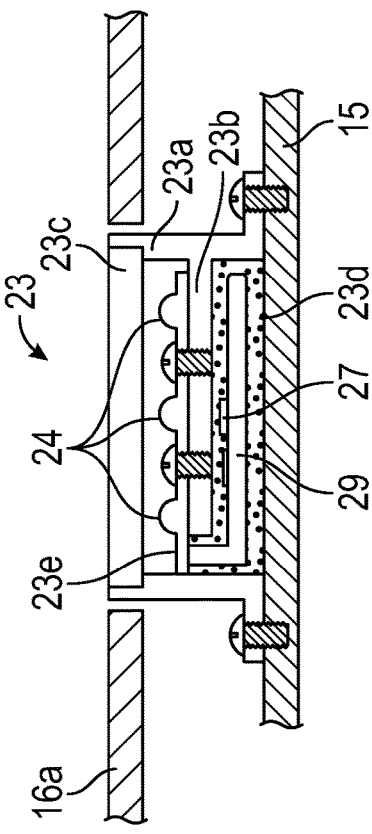
FIG. 3A
FIG. 3B

REPLACEMENT MIRROR SYSTEM WITH IR LED OVERHEATING MANAGEMENT

CROSS-REFERENCE TO RELATED APPLICATIONS

This application is a continuation of U.S. patent application Ser. No. 16/787,403 filed on Feb. 11, 2020, which claims priority to U.S. Provisional Application No. 62/805,535 filed on Feb. 14, 2019, and is incorporated herein by reference.

BACKGROUND

This disclosure relates to a camera mirror system having night vision.

Some types of cameras, such as an RGB camera, will not display an image that is visible at night. One approach to providing a visible image at night is to illuminate the camera's field of view with infrared light-emitting diodes (IR LED).

IR LED systems generate heat as they consume power. If the heat is not sufficiently dissipated, an overheating condition may occur, which can cause damage to the circuitry or generate malfunctions in the system. Solutions have been proposed which cycle the IR LEDs on and off. This may be undesirable for rear facing camera mirror systems of the type employed on commercial trucks.

SUMMARY OF THE INVENTION

In one exemplary embodiment, a camera mirror system for a vehicle includes, among other things, a camera that has a field of view, a display in communication with the camera that is configured to depict the field of view, and an infrared light-emitting diode (IR LED) that is configured to illuminate the field of view. The IR LED is configured to operate at a temperature. The system further includes a controller that is configured to provide at least one of a warning or an IR LED shut down command in response to the temperature exceeding a threshold.

In a further embodiment of any of the above, the field of view corresponds to one of a corner view or a rear-facing field view. The display is configured to display at least one of class II and class IV views illuminated by the IR LED for the rear-facing view. The display is configured to display at least one of class V and class VI views illuminated by the IR LED for the corner view.

In a further embodiment of any of the above, the system includes a temperature sensor that is configured to measure the temperature of the IR LED and includes a camera housing. The camera, the IR LED and the temperature sensor are arranged in the camera housing and are configured to be arranged outside of the vehicle.

In a further embodiment of any of the above, the controller is in communication with the temperature sensor and is arranged in the camera housing. The controller is a first controller and includes a second controller that is in communication with the camera. The second controller includes a video processor that is configured to provide a video signal to the display.

In a further embodiment of any of the above, the system includes a camera housing. The camera and the IR LED are arranged in the camera housing and configured to be arranged outside the vehicle. The controller is arranged outside the camera housing and is configured to be arranged inside the vehicle. The controller is configured to sense current from the IR LED and infer the temperature based upon the current.

In a further embodiment of any of the above, the IR LED is mounted on a first controller. The controller is a second controller that includes a video processor that is configured to provide a video signal to the display. The first and second controllers are connected by a wire bundle that consists of two wires. The current is provided over the wires.

In a further embodiment of any of the above, the second controller is configured to command the IR LED on the first controller between multiple output levels over the wire bundle.

In a further embodiment of any of the above, the warning corresponds to a symbol on the display.

In a further embodiment of any of the above, the system includes a switch. The IR LED shut down command is provided by the switch. The switch is configured to be manually operated by a driver to turn the IR LED on and off.

In another exemplary embodiment, a method of managing night vision for a vehicle camera mirror system includes, among other things, the steps of powering an infrared light-emitting diode (IR LED), sensing a temperature related to the IR LED, and commanding one of a warning or the IR LED in response to the temperature exceeding a threshold.

In a further embodiment of any of the above, the powering step includes illuminating a vehicle trailer. The method further includes a step of displaying at least one of class II and class IV views illuminated by the IR LED.

In a further embodiment of any of the above, the method includes a camera housing. The camera, the IR LED and the temperature sensor are arranged in the camera housing and outside of the vehicle.

In a further embodiment of any of the above, a controller is arranged in the camera housing.

In a further embodiment of any of the above, the sensing step includes sensing the temperature with a temperature sensor connected to a printed circuit board to which the IR LED is mounted.

In a further embodiment of any of the above, the sensing step includes sensing a current provided to the IR LED. The temperature is inferred from the current.

In a further embodiment of any of the above, the method includes a step of manually switch off the IR LED after displaying the warning symbol.

In a further embodiment of any of the above, the powering step includes manually switching on the IR LED.

In another exemplary embodiment, a camera mirror system for a vehicle includes, among other things, a camera arm that has a metallic mounting bracket that supports a camera housing. The system also includes a camera that is arranged in the camera housing and includes a field of view. The system further includes a night vision assembly that includes an infrared light-emitting diode (IR LED) that is configured to illuminate the field of view. The night vision assembly is secured to the mounting bracket.

In a further embodiment of any of the above, the night vision assembly includes a metallic housing that supports a metallic carrier. The IR LED is mounted to the metallic carrier. A front window is arranged over the IR LED and sealed relative to the metallic housing. The front window is exposed through an aperture in the camera housing.

In a further embodiment of any of the above, a printed circuit board is arranged in the metallic housing and is in communication with the IR LED. The metallic housing is filled with potting material.

BRIEF DESCRIPTION OF THE DRAWINGS

The disclosure can be further understood by reference to the following detailed description when considered in connection with the accompanying drawings wherein:

FIG. 3A is partial schematic view of a camera arm with a night vision assembly.

FIG. 3B a schematic view of an example night vision assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
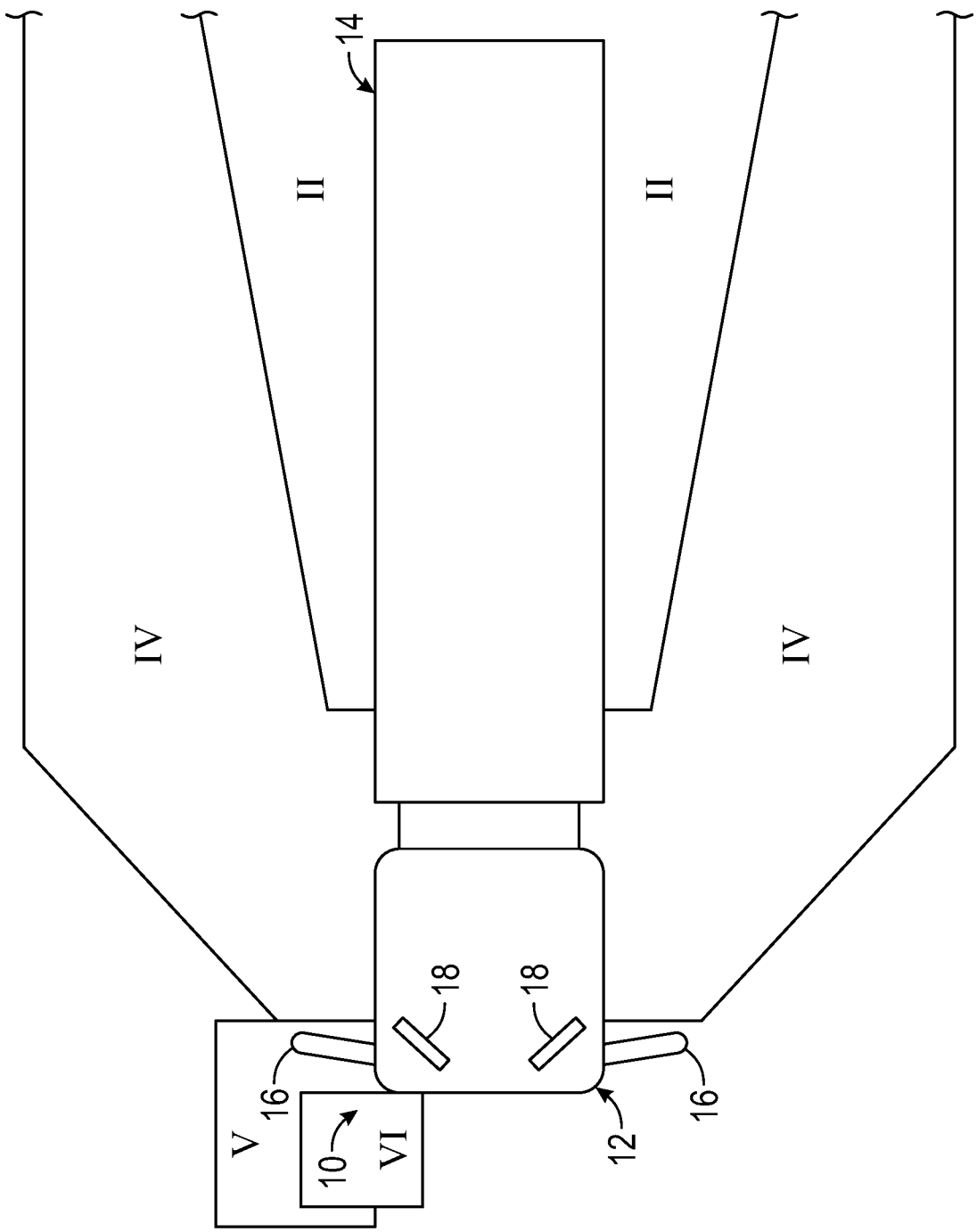
FIG. 1 is a schematic top elevational view of a commercial truck with class II and class IV views.

A schematic view of a commercial truck 10 is illustrated in FIG. 1. The truck 10 includes a vehicle cab 12 pulling a trailer 14. Driver and passenger side camera housings 16, provided as arms, are mounted to the vehicle cab 12. If desired, the camera housings 16 may include conventional mirrors integrated with them as well. First and second displays 18 are arranged on each of the driver and passenger sides within the vehicle cab 12 to display class II and class IV views on each side of the vehicle 10. Additional displays may be used, and additional or different class views may be provided by the system, if desired.

Figure 2A:
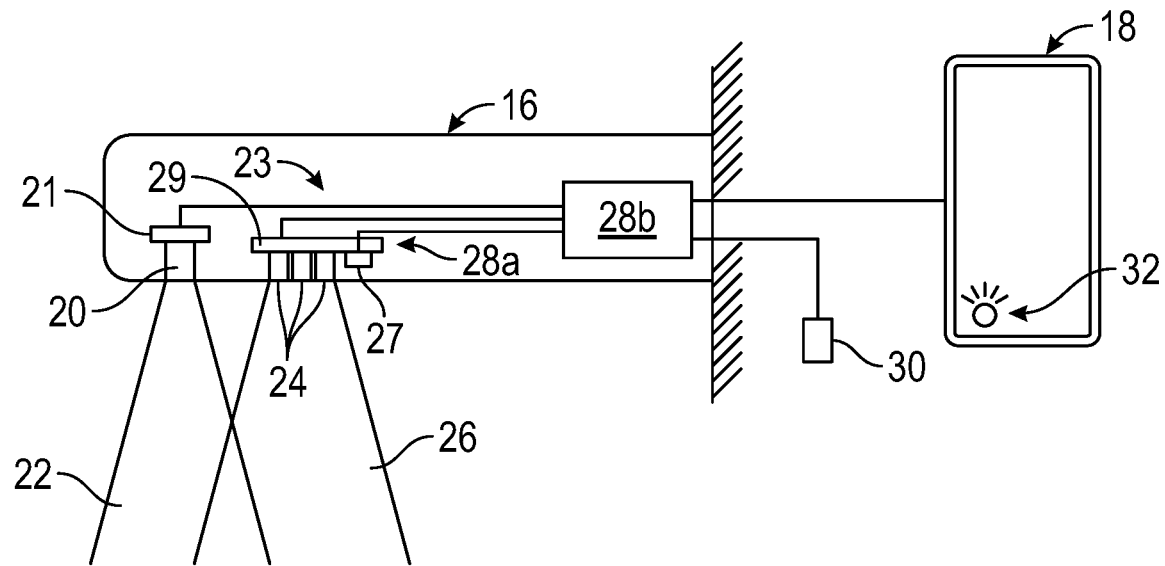
FIG. 2A is a schematic of a camera mirror system having night vision according to a first embodiment.
Figure 2B:
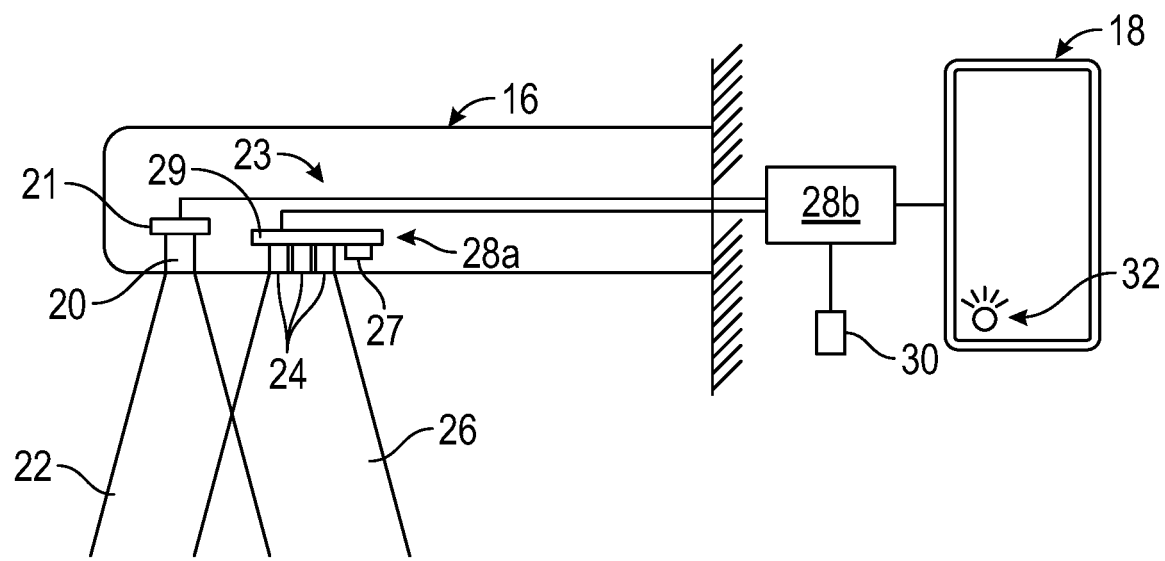
FIG. 2B is a schematic of another camera mirror system having night vision according to a second embodiment.

Referring to FIGS. 2A and 2B, at least one rearward facing camera 20 is arranged within the camera housing 16. The camera 20 includes an image capture unit 21 that provides a field of view 22 corresponding to at least one of the class II and class IV views, for example. Multiple cameras also may be used to provide the desired views. Class V and class VI views may also be desirable in order to provide views at the opposite front corner from the driver.

Some regulations governing mirror replacement camera systems require that certain objects be displayed to the driver in color. Some examples include stop signs and emergency lights. To this end, it is desirable to provide a night vision system that both illuminates the field of view 22 but is also able to provide a display to the driver in the necessary colors. At least one infrared light-emitting diode (IR LED) 24, which may be provided as a light array, illuminates a field of view 26 that overlaps the field of view 22.

The IR LEDs 24, when in use, consume a sufficient amount of power to generate undesired heat that can damage circuitry or generate malfunctions in the system. In one example system shown in FIG. 2A, a night vision assembly 23 includes a temperature sensor 27 that is provided in close proximity to IR LEDs 24, for example, on a common circuit board 29 with the IR LEDs 24 to provide a first controller 28a. The temperature sensor 27 is configured to measure a temperature of the IR LEDs, either directly or indirectly.

A second controller 28b is in communication with the temperature sensor 27. In an example embodiment, the first and second controllers 28a, 28b may be provided on a common PCB. The second controller 28b includes a video processor that provides a video signal containing images from the image capture unit 21 to the display 16. Depending on the desired configuration, the second controller 28b may be located within the camera housing 16 or within the display 18. In the example shown in FIG. 2A, the second controller 28b is arrange in the camera housing 16.

The second controller 28b may also be in communication with the IR LEDs 24 to command the IR LEDs on and off. In one example, a manual switch 30 may be used by the driver to manually turn on and off the IR LEDs 24.

The second controller 28b is configured to provide at least one of a warning or an IR LED shut down command in response to the temperature detected by the temperature sensor 27 exceeding a temperature threshold. The temperature threshold corresponds to an undesired IR LED temperature at which or near the temperature that the IR LEDs 24 or associated circuitry may become damaged or malfunction. A warning of the undesired IR LED temperature is communicated to the driver, such as by displaying a warning symbol 32 on the display 18 or by providing another type of audio and/or visual warning elsewhere.

Another example system is shown in FIG. 2B, but with the second controller 28b located outside of the camera housing 16. The system may function and be configured in a similar manner to the system described above in connection with FIG. 2A, if desired.

To mitigate heat issues, the night vision assembly 23 is mounted to a metallic mounted bracket 15 (e.g., aluminum) secured to the vehicle cab 12, as shown in FIG. 3A. The mounting bracket 15 supports the camera housing 16, which may include a fixed portion 16a and a pivotable portion 16b. The camera 20 (FIGS. 2A and 2B) is arranged in the pivotable portion 16b. A pivot member 17 passively or actively enables the pivotable portion 16b to rotate with respect to the fixed portion 16a. The night vision assembly 23, which includes the IR LEDs 24, is secured to the mounting bracket 15 to conductively dissipate heat to this large, metallic structure.

In one example shown in FIG. 3B, the night vision assembly 23 includes a metallic housing 23a supporting a metallic carrier 23b, which are aluminum in one example. The IR LEDs 24 are mounted to the metallic carrier 23b via a metallic board 23e, and a transparent front window 23c is arranged over the IR LEDs 24 and sealed relative to the metallic housing 23a, for example, with glue. The front window 23c is exposed through an aperture in the fixed portion 16a so that the desired area may be illuminated with infrared light. The printed circuit board 29, which drives the IR LEDs 24, is arranged in the metallic housing 23a and is in communication with the IR LEDs 24. The metallic housing 23a is filled with potting material 23d.

The controller 28b is configured to provide at least one of a warning or an IR LED shut down command in response to the temperature detected by the temperature sensor 27 exceeding a temperature threshold. The configuration shown in FIG. 2B may use a simplified wiring scheme (FIG. 3A) in which a wire bundle 34 interconnecting the first and second controllers 28a, 28b only includes two wires 36 (ground and power) that are used to power the IR LEDs 24 via the first controller 28a.

The second controller 28b may command the first controller 28a between multiple IR LED output levels, e.g., 100% power and 30% power, using the wire bundle 34. Since only two wires 36 are used, the second controller 28a may detect an over-temperature condition by sensing a reduction in current in the wires 36 as compared to the expected current for the commanded power level. The reduced current is interpreted by the second controller 28b as the IR LEDs being at an undesirably high temperature, and the second controller 28b may display a warning symbol 32, command the IR LEDs 24 automatically to a lower output level, and/or shut the IR LEDs 24 off.

Figure 4:
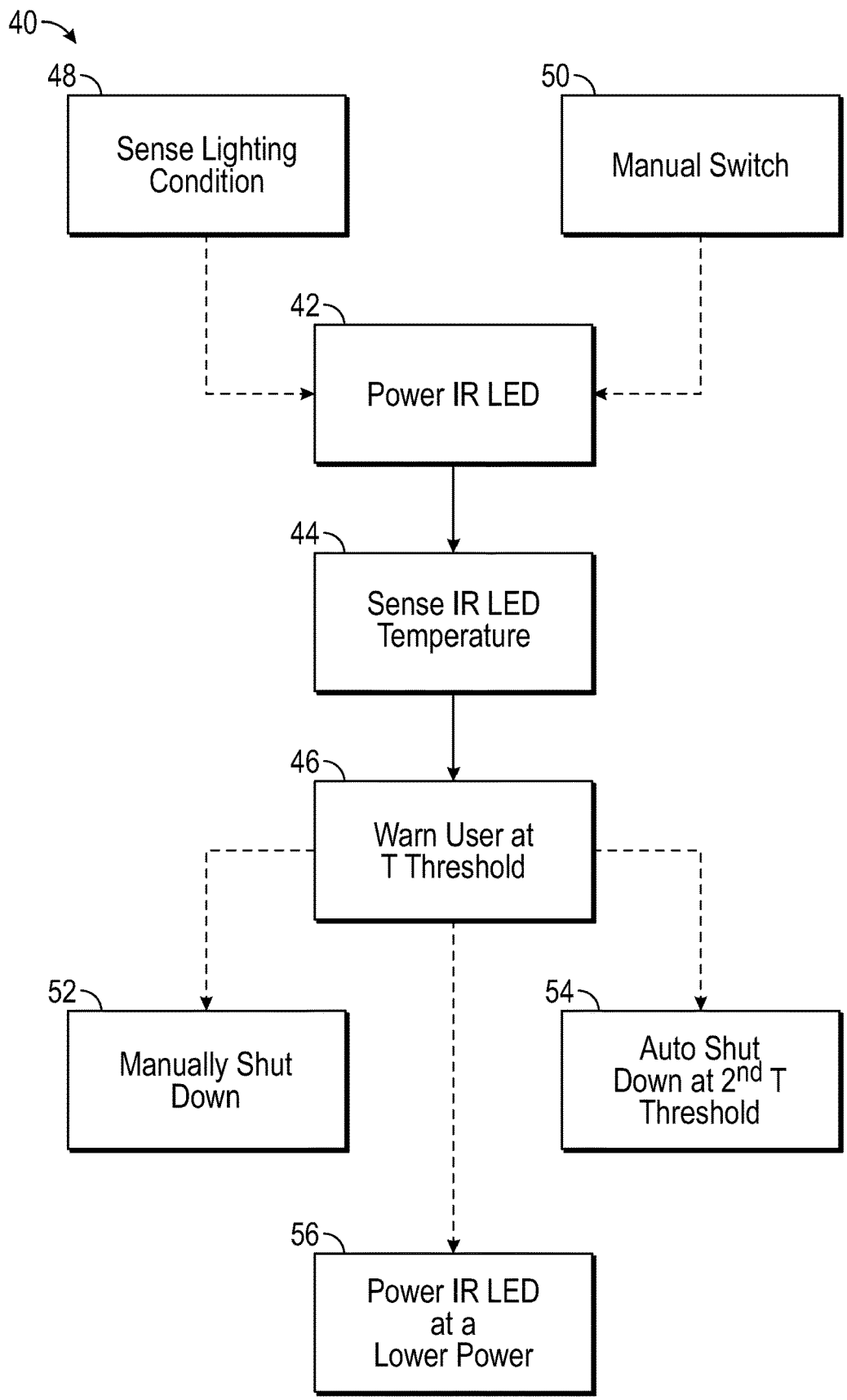
FIG. 4 is a flow chart depicting an example method of managing night vision for a vehicle camera mirror system.

Referring to FIG. 4, a method 40 of managing night vision for a vehicle camera system is shown. The method 40 includes powering the IR LEDs 24 when desired, as indicated at block 42. This may be performed by a light sensor automatically sensing a low light condition (block 48) and/or automatically turning on the IR LEDs 24 (e.g., with the vehicle headlights). Alternatively, the switch 30 may be used by the driver to manually turn on and off the IR LEDs 24, as indicated at block 50, whenever desired.

The temperature sensor 27 senses the IR LED temperature, directly or indirectly, as indicated at block 44. Once the sensed temperature exceeds a threshold, as indicated at block 46, the driver may be warned, for example, by displaying a warning symbol 32 on the display 18. At this point, the driver may manually shut down the IR LEDs 24 using the switch 30, as indicated at block 52, or the IR LEDs may be automatically shut down once a second temperature threshold is exceeded, as indicated at block 54, to discontinue power to the IR LEDs 24 after a predetermined time from the warning. The IR LEDs 24 may also be powered at a lower output level (block 56) to reduce the wattage, thereby reducing heat production. In this manner, the integrity of the circuitry is maintained and any system malfunctions are avoided.

If desired, the driver may be notified when the temperature has dropped sufficiently and the night vision system may be used again, or the night vision system may be automatically turned on, or output level increased, by the system.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera mirror system for a vehicle comprising:
    a camera arm includes a pivotal portion pivotably mounted to a fixed portion, the camera arm having a metallic bracket;
    a camera arranged in the pivotal portion of the camera arm, the camera providing a field of view;
    a night vision assembly including an infrared light-emitting diode (IR LED) arranged in another housing and configured to illuminate the field of view, the other housing secured to the metallic bracket, wherein the other housing has a metallic carrier, the IR LED mounted to the metallic carrier, and a front window arranged over the IR LED and sealed relative to the other housing, the front window exposed through an aperture in the camera housing.

2. The system of claim 1, wherein a printed circuit board is arranged in the other housing and in communication with the IR LED, the other housing filled with potting material.

3. The system of claim 1 comprising:
    a display in communication with the camera configured to depict the field of view;
    wherein the IR LED configured to operate at a temperature; and
    a controller configured to provide at least one of a warning or an IR LED shut down command in response to the temperature exceeding a threshold.

4. The system of claim 3, wherein the field of view corresponds to one of a corner view or a rear-facing field view, wherein the display is configured to display at least one of class II and class IV views illuminated by the IR LED for the rear-facing view, and the display is configured to display at least one of class V and class VI views illuminated by the IR LED for the corner view.

5. The system of claim 1, comprising a temperature sensor configured to measure the temperature of the IR LED, the IR LED and the temperature sensor are arranged in the camera housing and configured to be arranged outside of the vehicle.

6. The system of claim 5, wherein the controller is a printed circuit board in communication with the temperature sensor and is arranged in the other housing, the controller is a first controller, and comprising a second controller that is in communication with the camera, the second controller includes a video processor that is configured to provide a video signal to the display.

7. The system of claim 3, wherein the controller is arranged outside the camera housing and configured to be arranged inside the vehicle, wherein the controller is configured to sense current from the IR LED and infer the temperature based upon the current.

8. The system of claim 7, wherein the IR LED is mounted on a first controller providing a printed circuit board arranged in the other housing, and the controller is a second controller that includes a video processor configured to provide a video signal to the display, the first and second controllers connected by a wire bundle consisting of two wires, the current provided over the wires.

9. The system of claim 8, wherein the second controller is configured to command the IR LED on the first controller between multiple output levels over the wire bundle.

10. The system of claim 3, wherein the warning corresponds to a symbol on the display.

11. The system of claim 3, comprising a switch, and the IR LED shut down command is provided by the switch, wherein the switch is configured to be manually operated by a driver to turn the IR LED on and off.

12. The system of claim 1, wherein the metallic bracket and the night vision assembly are arranged in the fixed portion.

* * * * *

UNITED STATES PATENT AND TRADEMARK OFFICE
CERTIFICATE OF CORRECTION

PATENT NO. : 11,665,801 B2
APPLICATION NO. : 17/486172
DATED : May 30, 2023
INVENTOR(S) : van den Brink et al.

Page 1 of 1

It is certified that error appears in the above-identified patent and that said Letters Patent is hereby corrected as shown below:

In the Claims

Claim 1, Column 5, Line 62, change "a camera arranged in the pivotal portion" to --a camera arranged in a camera housing of the pivotal portion--

Signed and Sealed this
Eighteenth Day of July, 2023

Katherine Kelly Vidal
*Director of the United States Patent and Trademark Office*